United States Patent
Da Silva et al.

(10) Patent No.: US 12,047,869 B2
(45) Date of Patent: Jul. 23, 2024

(54) POSITION INFORMATION AIDED Wi-Fi SENSING

(71) Applicant: Intel Corporation, Santa Clara, CA (US)

(72) Inventors: Claudio Da Silva, Portland, OR (US); Robert Stacey, Portland, OR (US); Carlos Cordeiro, Portland, OR (US); Bahareh Sadeghi, Portland, OR (US); Cheng Chen, Portland, OR (US)

(73) Assignee: INTEL CORPORATION, Santa Clara, CA (US)

( * ) Notice: Subject to any disclaimer, the term of this patent is extended or adjusted under 35 U.S.C. 154(b) by 796 days.

(21) Appl. No.: 17/022,132

(22) Filed: Sep. 16, 2020

(65) Prior Publication Data

US 2022/0086739 A1    Mar. 17, 2022

(51) Int. Cl.
H04W 48/16      (2009.01)
H04W 4/02       (2018.01)
H04W 48/04      (2009.01)

(52) U.S. Cl.
CPC .............. *H04W 48/16* (2013.01); *H04W 4/02* (2013.01); *H04W 48/04* (2013.01)

(58) Field of Classification Search
CPC ........ H04W 48/16; H04W 4/02; H04W 48/04
USPC .......................................................... 370/329
See application file for complete search history.

(56) References Cited

U.S. PATENT DOCUMENTS 9,838,900 B2 * 12/2017 Zhou ..................... H04W 24/10
2020/0021466 A1 * 1/2020 Da Silva ............. H04L 25/0242

FOREIGN PATENT DOCUMENTS

CN         109168175 B       4/2020

OTHER PUBLICATIONS

Ma, Y., et al.; "WiFi Sensing with Channel State Information: A Survey"; Jun. 2019; 36 pages; Association for Computing Machinery (ACM) Computing Surveys, vol. 52, No. 3, Article 46.
Da Silva, C. et al.; "Wi-Fi Sensing: Cooperation and Standard Support"; Sep. 6, 2019; 24 pages; IEEE 802.11-19/1416r0.
Da Silva, C. et al.; "Presence and Proximity Detection Using WLAN Sensing"; Oct. 24, 2019; 17 pages; IEEE 802.11-19/1772r0.

(Continued)

*Primary Examiner* — Chuck Huynh
(74) *Attorney, Agent, or Firm* — VIERING, JENTSCHURA & PARTNER mbB

(57) ABSTRACT

A wireless communication device for communicating across a wireless communication channel includes a memory storing instructions and one or more processors coupled to the memory to execute the instructions stored in the memory. The instructions are configured to determine a plurality of channel estimation measurements corresponding to a plurality of PPDUs received from an additional wireless communication device; determine a plurality of position measurements using information about the transmission of the plurality of PPDUs, wherein the position measurement is a position of the additional wireless communication device relative to the wireless communication device; select a subset of the plurality of channel estimation measurements based on the plurality of position measurements; and determine a change in a state of the wireless communication channel based on the selected subset of the plurality of channel estimation measurements.

10 Claims, 7 Drawing Sheets

(56) References Cited

OTHER PUBLICATIONS

Abdullah Junaid et al. "Geometry optimization for WiFi-based indoor passive multistatic radars"; 13th International Wireless Communications and Mobile Computing Conference, dated Jun. 26, 2017, pp. 2068-2072.

Kazuya Ohara et al. Easy-to-Install Methods for Indoor Context Recognition Using Wi-Fi Signals, Springer International Publishing AG, Part of Springer Nature 2018, dated May 30, 2018, pp. 112-124.

European Search Report issued for the corresponding european application No. EP 21 18 3093, dated Dec. 13, 2021, 8 pages (for informational purposes only).

\* cited by examiner

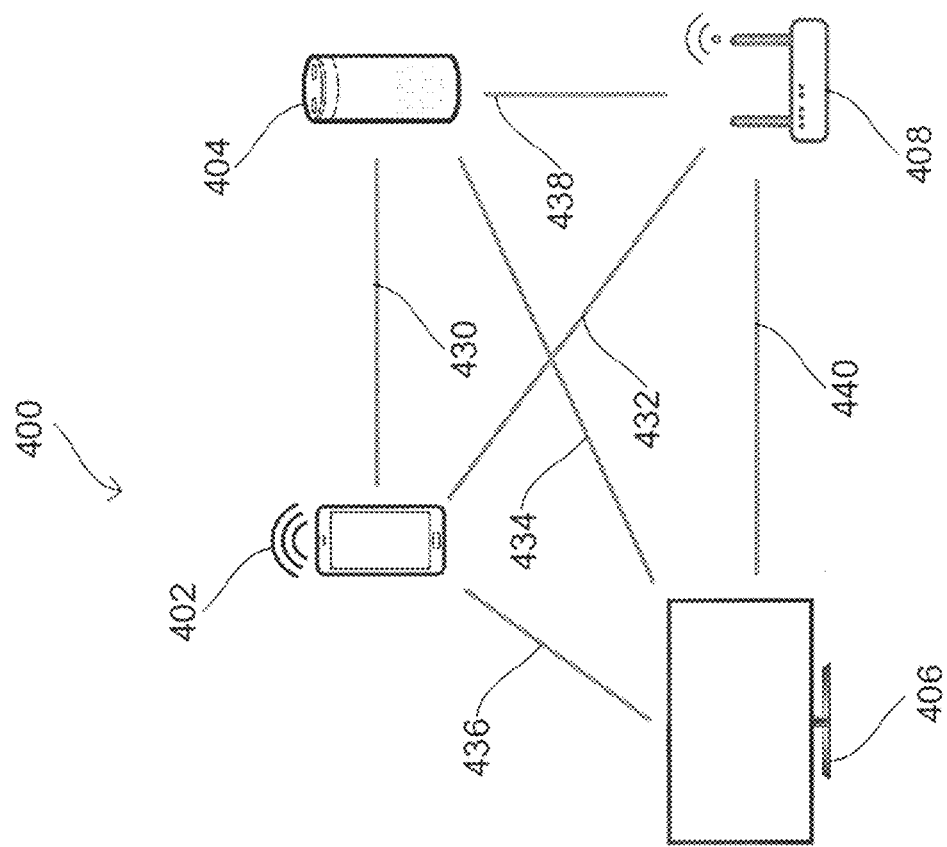
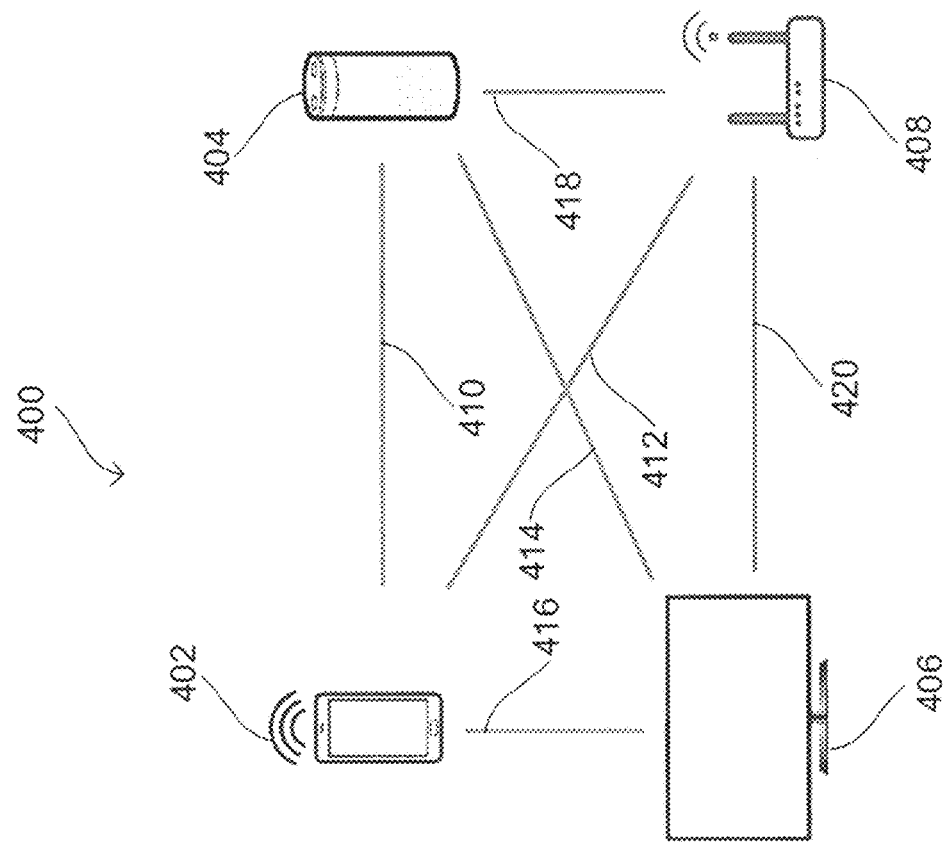

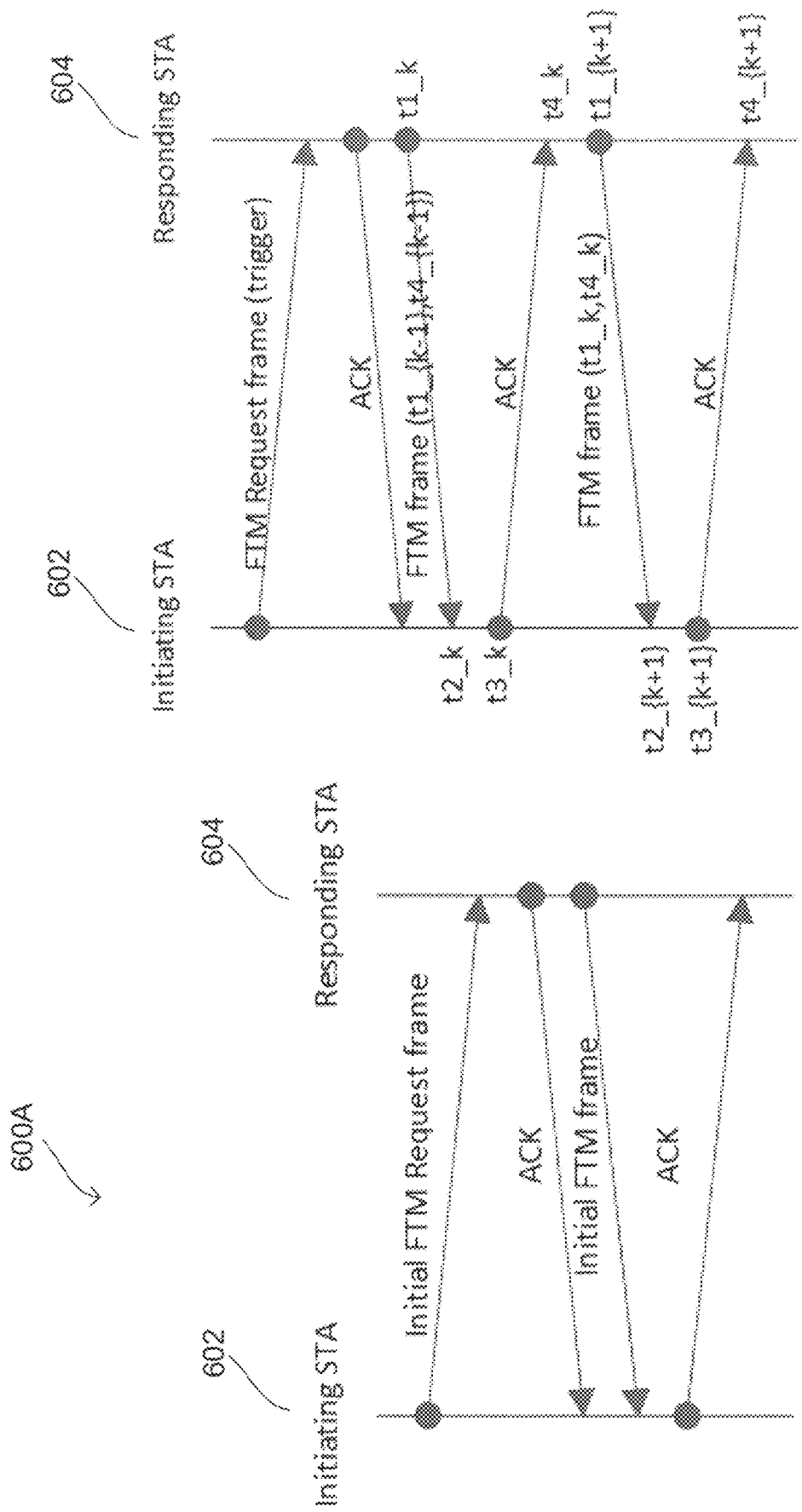

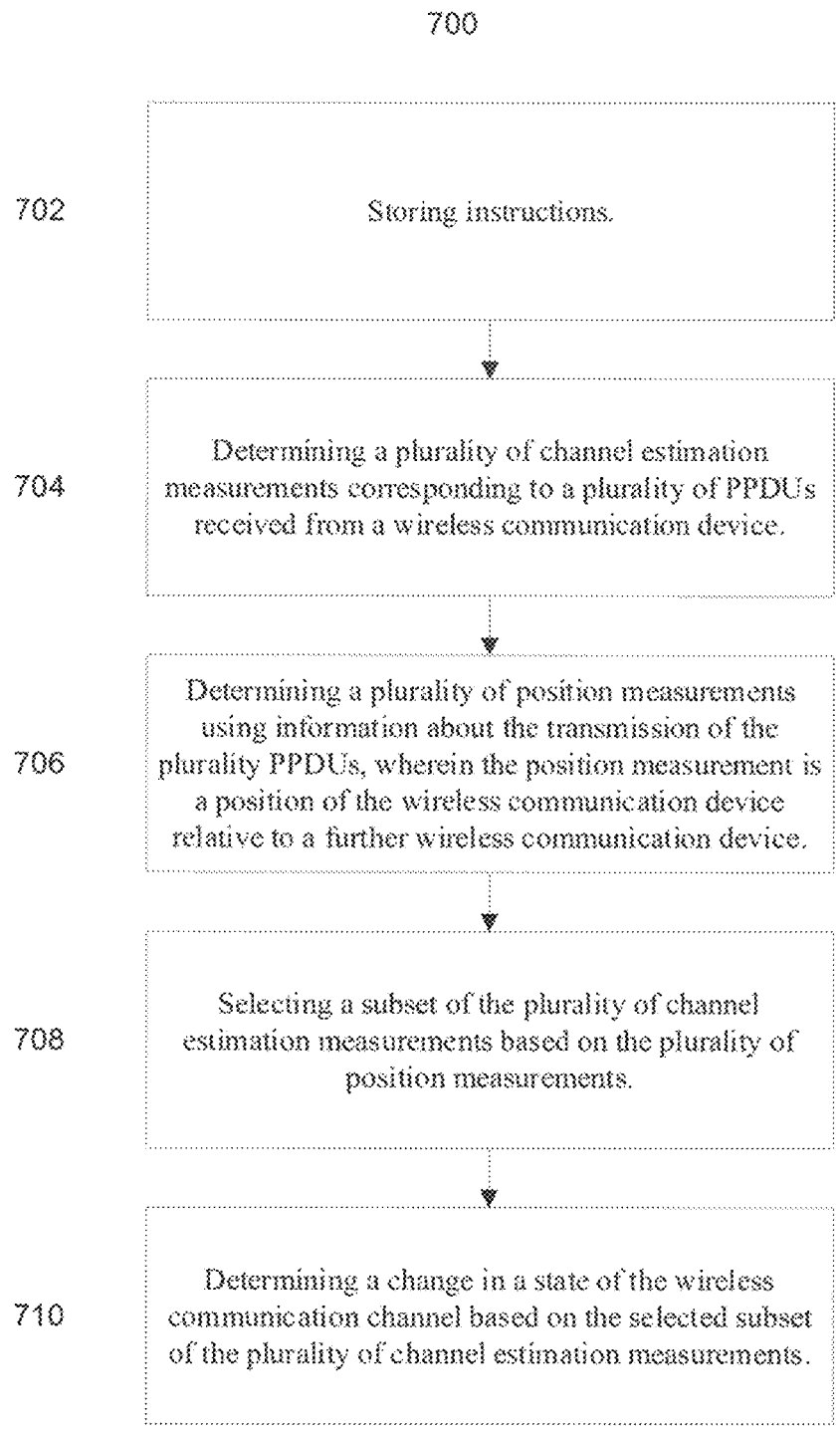

POSITION INFORMATION AIDED Wi-Fi SENSING

TECHNICAL FIELD

Various aspects relate generally to methods and systems for aiding Wi-Fi sensing with the use of positioning technology.

BACKGROUND

Wireless networks often use 802.11 technology to perform Wi-Fi sensing. Wi-Fi sensing is performed by tracking channel estimate information (CSI) obtained from multiple packets and detecting changes that may indicate an event of interest. Performance of Wi-Fi sensing can be noticeably improved with the relative position information between the stations participating in Wi-Fi sensing.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various aspects of the invention are described with reference to the following drawings, in which:

FIGS. 4A and 4B show an exemplary Wi-Fi sensing system according to some aspects;

FIGS. 6A and 6B show an exemplary process for a station to determine position information;

FIG. 7 shows an exemplary method of performing Wi-Fi sensing with the use of position information.

DESCRIPTION

Figure 1:
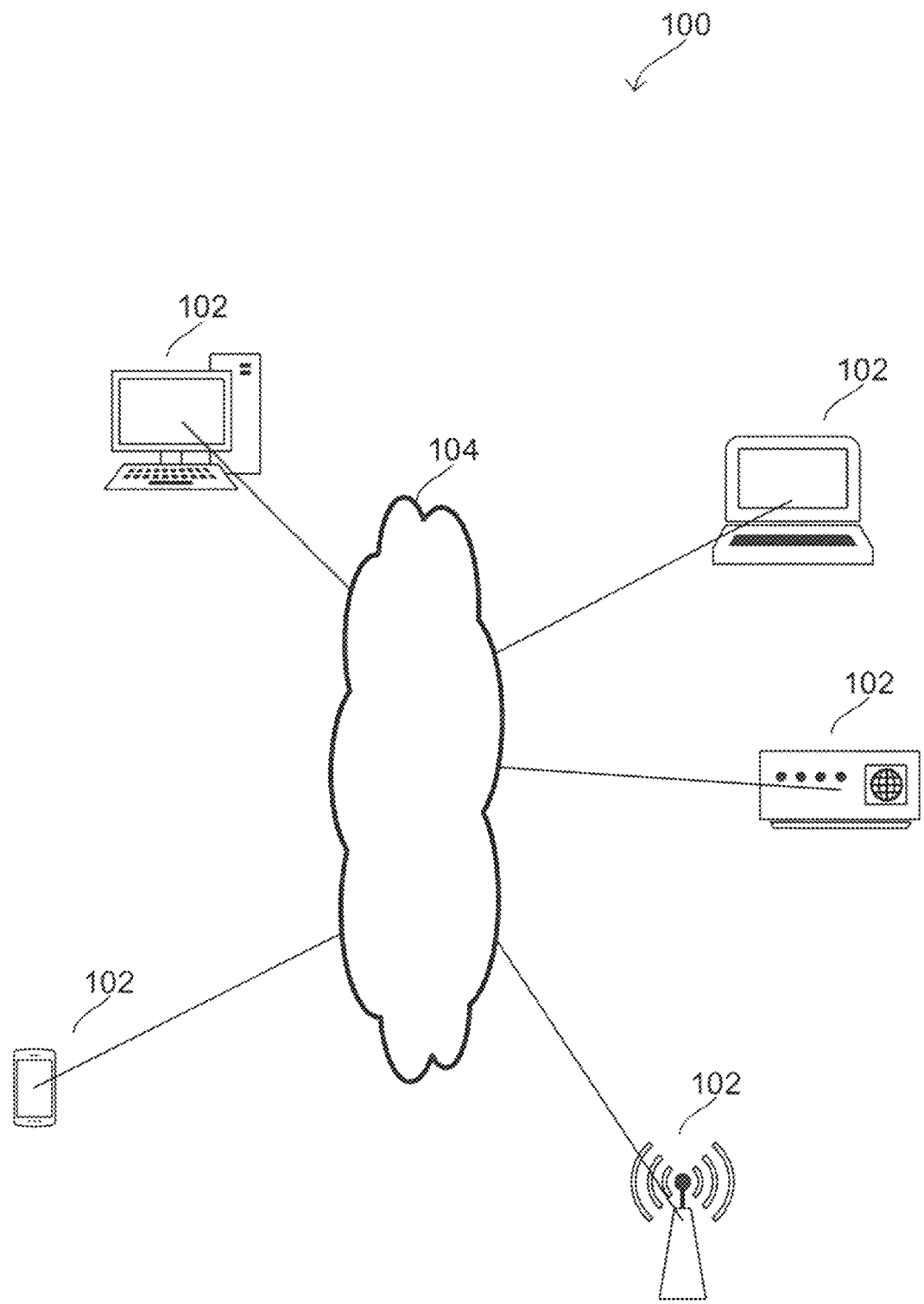
FIG. 1 shows an exemplary wireless communication channel network according to some aspects.

The following detailed description refers to the accompanying drawings that show, by way of illustration, specific details and aspects in which the invention may be practiced.

The word "exemplary" is used herein to mean "serving as an example, instance, or illustration." The words "plurality" and "multiple" in the description and claims refer to a quantity greater than one. The terms "group," "set", "sequence," and the like refer to a quantity equal to or greater than one. Any term expressed in plural form that does not expressly state "plurality" or "multiple" similarly refers to a quantity equal to or greater than one. The term "lesser subset" refers to a subset of a set that contains less than all elements of the set. Any vector and/or matrix notation utilized herein is exemplary in nature and is employed for purposes of explanation. Aspects of this disclosure described with vector and/or matrix notation are not limited to being implemented with vectors and/or matrices and the associated processes and computations may be performed in an equivalent manner with sets or sequences of data or other information.

As used herein, "memory" is understood as a non-transitory computer-readable medium in which data or information can be stored for retrieval. References to "memory" included herein may thus be understood as referring to volatile or non-volatile memory, including random access memory (RAM), read-only memory (ROM), flash memory, solid-state storage, magnetic tape, hard disk drive, optical drive, among others, or any combination thereof. Registers, shift registers, processor registers, data buffers, among others, are also embraced herein by the term memory. The term "software" refers to any type of executable instruction, including firmware.

Unless explicitly specified, the term "transmit" encompasses both direct (point-to-point) and indirect transmission (via one or more intermediary points). Similarly, the term "receive" encompasses both direct and indirect reception. Furthermore, the terms "transmit", "receive", "communicate", and other similar terms encompass both physical transmission (e.g., the transmission of radio signals) and logical transmission (e.g., the transmission of digital data over a logical software-level connection). For example, a processor or controller may transmit or receive data over a software-level connection with another processor or controller in the form of radio signals, where the physical transmission and reception is handled by radio-layer components such as RF transceivers and antennas, and the logical transmission and reception over the software-level connection is performed by the processors or controllers.

The term "station" or "STA" as utilized herein refers to a network device that is capable of using WLAN/Wi-Fi technology (e.g., according to any IEEE 802.11 standard). "STA" can include mobile or immobile wireless communication devices, including Access Points (APs), User Equipments (UEs), smart televisions, tablets, laptops, personal computers, wearables, multimedia playback and other handheld or body-mounted electronic devices, consumer/home/office/commercial appliances, vehicles, and any other electronic device capable of Wi-Fi communications.

The term "W-Fi sensing" (also referred to as "wireless sensing" or "WLAN sensing") may refer to a usage of wireless technology to detect changes in an environment. For example, WLAN sensing is the use of IEEE 802.11 technology to enable WLANs and electronic devices with WLAN capability to obtain channel measurements that characterize the environment in which they are located, thus gaining spatial and contextual awareness of their surroundings, and enable applications such as presence and proximity detection, device-free positioning, and gesture classification, among many others. Wi-Fi sensing applications may support in both 2.4/5/6 GHz and 60 GHz.

The term "model" as used herein may be understood as any kind of algorithm, which provides output data from input data. For example, an algorithm generating or calculating output data from input data.

Some aspects may be used in conjunction with devices and/or networks operating in accordance with existing IEEE 802.11 standards. For example, IEEE 802.11-2016 and IEEE 802.11az, and/or future versions and/or derivatives thereof. Some aspects may be used in conjunction with a WLAN, e.g., a WiFi network or any other suitable wireless communication network, for example, a wireless area network, a "piconet", a WPAN, a WVAN for example.

Additionally, devices and/or networks operating in accordance with existing technology and/or protocols, e.g., 3rd Generation Partnership Project (3GPP), 3GPP Long Term Evolution (LTE), WFA Peer-to-Peer (P2P) specifications (WiFi P2P technical specification, version 1.7, Jul. 6, 2016), Radio Frequency (RF), Infrared (IR), Frequency-Division Multiplexing (FDM), Orthogonal FDM (OFDM), Orthogonal Frequency-Division Multiple Access (OFDMA), Time-Division Multiplexing (TDM), Time-Division Multiple Access (TDMA), Multi-User MIMO (MU-MIMO), Spatial Division Multiple Access (SDMA), Extended TDMA (ETDMA), General Packet Radio Service (GPRS), Extended GPRS, Code-Division Multiple Access (CDMA), Wideband CDMA (WCDMA), CDMA 2000, singlecarrier CDMA, multi-carrier CDMA, Multi-Carrier Modulation (MCM), Discrete Multi-Tone (DMT), Bluetooth®, Global Positioning System (GPS), Global Navigation Satellite System (GNSS), Wi-Fi, Wi-Max, ZigBee™, Ultra-Wideband (UWB), Global System for Mobile communication (GSM), 2G, 2.5G, 3G, 3.5G, 4G, Fifth Generation (5G), or Sixth Generation (6G) mobile networks, 3GPP, Long Term Evolution (LTE), LTE Advanced, Enhanced Data rates for GSM Evolution (EDGE), and/or future versions and/or derivatives thereof, may be used in conjunction with some aspects.

FIG. 1 depicts an exemplary network for wireless communication according to some aspects. Wireless communication network 100, such as a Wi-Fi network, may include one or more wireless communication devices 102 communicating via wireless medium 104. Wireless communication device 102 may be capable of communicating content, data, information and/or signals via a wireless medium 104. Devices 102 may operate as, and/or perform the functionality of one or more Wi-Fi STAs.

According to some aspects, wireless medium 104 may include, for example a, radio channel, cellular channel, GNSS channel, UWB channel, Global Positioning System GPS channel, RF channel, Wi-Fi channel, Infrared (IR) channel, among others.

According to some aspects, wireless communication medium 104 may include a 2.4 GHz frequency band, 5 GHz frequency band, millimeterWave (mmWave) frequency band, 60 GHz frequency band, Sub1 GHz (S1G) band, and/or one or more other wireless communication frequency bands.

Figure 2:
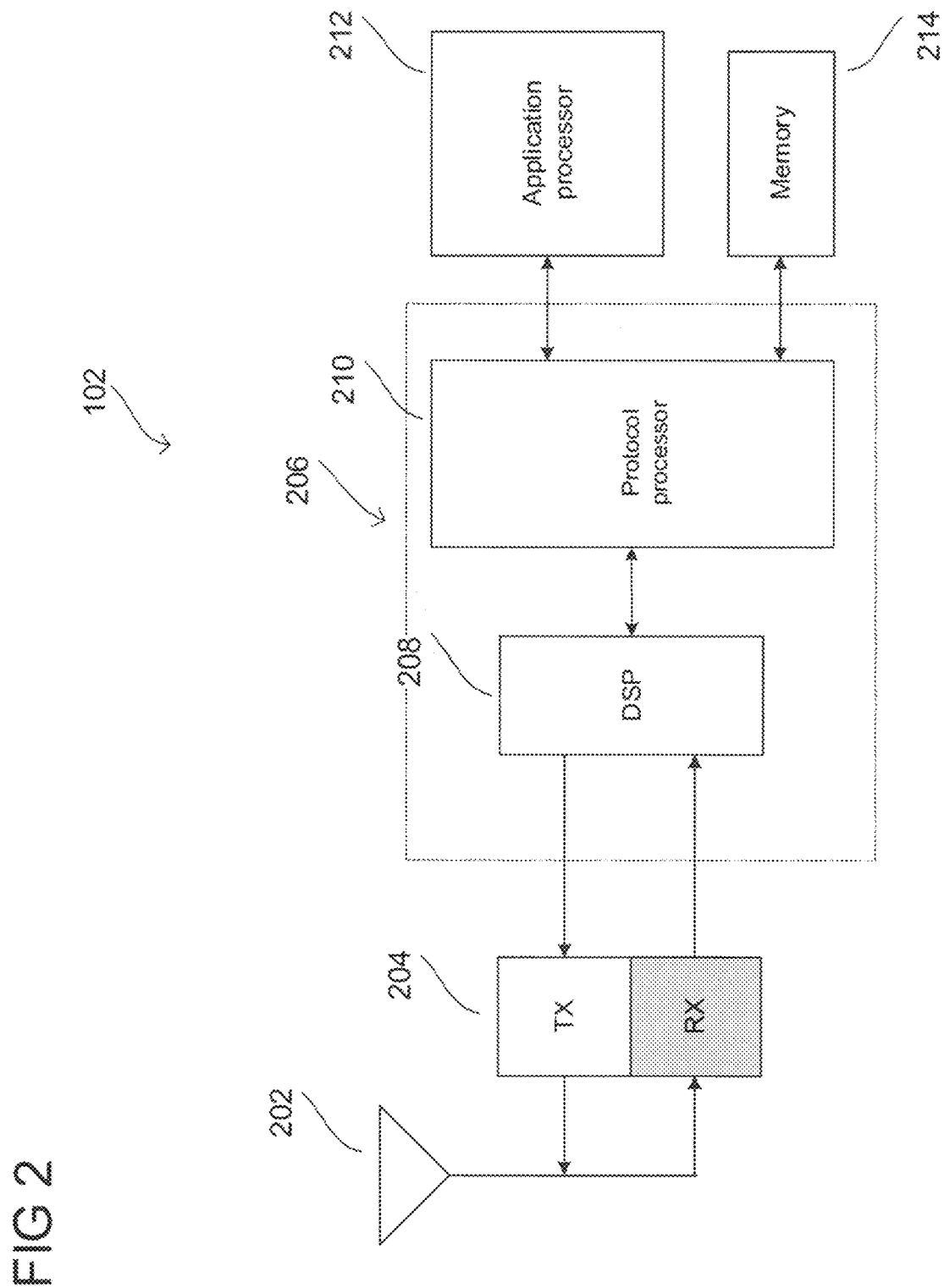
FIG. 2 shows an exemplary wireless communication device according to some aspects.

FIG. 2 shows an internal configuration of wireless communication device 102 according to some aspects. Wireless communication device 102 may include antenna system 202, transceiver 204, baseband modem 206 (including digital signal processor 208 and protocol controller 210), application processor 212, and memory 214. Although not explicitly shown in FIG. 2, in some aspects wireless communication device 102 may include one or more additional hardware and/or software components, such as processors/microprocessors, controllers/microcontrollers, other specialty or generic hardware/processors/circuits, peripheral device(s), memory, power supply, external device interface(s), subscriber identity module(s) (SIMs), user input/output devices (display(s), keypad(s), touchscreen(s), speaker(s), external button(s), camera(s), microphone(s), etc.), or other related components.

Wireless communication device 102 may transmit and receive radio signals on one or more radio access networks. Baseband modem 206 may direct this communication functionality of device 102 according to the communication protocols associated with each radio access network. Baseband modem 206 may thus control antenna system 202 and transceiver 204 to transmit and receive radio signals according to the formatting and scheduling parameters for the communication protocols. In some aspects where device 102 is configured to operate on multiple radio communication technologies, device 102 may include separate communication components for each supported radio communication technology (e.g., a separate antenna, RF transceiver, digital signal processor, and controller).

Device 102 may transmit and receive wireless signals with antenna system 202, which may be a single antenna or an antenna array that includes multiple antennas. In some aspects, antenna system 202 may additionally include analog antenna combination and/or beamforming circuitry. In the receive (RX) path, transceiver 204 may receive analog radio frequency signals from antenna system 202 and perform analog and digital RF front-end processing on the analog radio frequency signals to produce digital baseband samples (e.g., In-Phase/Quadrature (IQ) samples) for baseband modem 206. Transceiver 204 may include analog and digital reception components including amplifiers (e.g., Low Noise Amplifiers (LNAs)), filters, RF demodulators (e.g., RF IQ demodulators)), and analog-to-digital converters (ADCs), with which transceiver 204 may convert the received radio frequency signals to digital baseband samples. In the transmit (TX) path, transceiver 204 may receive digital baseband samples from baseband modem 206 and perform analog and digital RF front-end processing on the digital baseband samples to produce analog radio frequency signals for antenna system 202 to wirelessly transmit. Transceiver 204 may include analog and digital transmission components including amplifiers (e.g., Power Amplifiers (PAs), filters, RF modulators (e.g., RF IQ modulators), and digital-to-analog converters (DACs), which transceiver 204 may utilize to mix the digital baseband samples received from baseband modem 206 and produce the analog radio frequency signals for wireless transmission by antenna system 202. In some aspects baseband modem 206 may control the radio transmission and reception of transceiver 204. This may include specifying radio frequencies for transceiver 204 to transmit or receive on.

As shown in FIG. 2, baseband modem 206 may include digital signal processor 208, which may perform physical layer (PHY; Layer 1) transmission and reception processing. In the transmit path, digital signal processor 208 may prepare outgoing transmit data (from protocol controller 210) for transmission via transceiver 204. In the receive path, digital signal processor 208 may prepare incoming received data (from transceiver 204) for processing by protocol controller 210. Digital signal processor 208 may be configured to perform one or more of error detection, forward error correction encoding/decoding, channel coding and interleaving, channel modulation/demodulation, physical channel mapping, radio measurement and search, frequency and time synchronization, antenna diversity processing, power control and weighting, rate matching/dematching, retransmission processing, interference cancelation, and any other physical layer processing functions. Digital signal processor 208 may be structurally realized as hardware components (e.g., as one or more digitally-configured hardware circuits or FPGAs), software-defined components (e.g., one or more processors configured to execute program code defining arithmetic, control, and I/O instructions (e.g., software and/or firmware) stored in a non-transitory computer-readable storage medium), or as a combination of hardware and software components. In some aspects, digital signal processor 208 may include one or more processors configured to retrieve and execute program code that defines control and processing logic for physical layer processing operations. In some aspects, digital signal processor 208 may execute processing functions with software via the execution of executable instructions. In some aspects, digital signal processor 208 may include one or more dedicated hardware circuits (e.g., ASICs, FPGAs, and other hardware) that are digitally configured to specific execute processing functions. The one or more processors of digital signal processor 208 may offload certain processing tasks to these dedicated hardware circuits, which are known as hardware accelerators. Exemplary hardware accelerators can include Fast Fourier Transform (FFT) circuits and encoder/decoder circuits. In some aspects, the processor and hardware accelerator components of digital signal processor 208 may be realized as a coupled integrated circuit.

Device 102 may be configured to operate according to one or more communication technologies. Digital signal processor 208 may be responsible for lower-layer processing functions (e.g., Layer 1/PHY) of the radio communication technologies, while protocol controller 210 may be responsible for upper-layer protocol stack functions (e.g., Data Link Layer/Layer 2 and/or Network Layer/Layer 3). Protocol controller 210 may thus be responsible for controlling the communication components of device 102 (antenna system 202, transceiver 204, and digital signal processor 208) according to the communication protocols of each supported radio communication technology. In some aspects, protocol controller 210 may represent the Access Stratum and Non-Access Stratum (NAS) (also encompassing Layer 2 and Layer 3) of each supported radio communication technology. Protocol controller 210 may be structurally embodied as a protocol processor configured to execute protocol stack software (retrieved from a controller memory) and subsequently control the radio communication components of device 102 to transmit and receive communication signals according to the protocol stack control logic in the protocol software. Protocol controller 210 may include one or more processors configured to retrieve and execute program code that defines the upper-layer protocol stack logic for one or more radio communication technologies, which can include Data Link Layer/Layer 2 and Network Layer/Layer 3 functions. Protocol controller 210 may be configured to perform both user-plane and control-plane functions to transfer application layer data to and from device 102 with the specific protocols of the supported radio communication technology. User-plane functions can include header compression and encapsulation, security, error checking and correction, channel multiplexing, scheduling and priority, while control-plane functions may include setup and maintenance of radio bearers. The program code retrieved and executed by protocol controller 210 may include executable instructions that define the logic of such functions.

Device 102 may also include application processor 212 and memory 214. Application processor 212 may be a CPU configured to handle the layers above the protocol stack, including the transport and application layers. Application processor 212 may be configured to execute various applications and/or programs of device 102 at an application layer of device 102. These applications and/or programs may include an operating system (OS), a user interface (UI) for supporting user interaction with device 102, and/or various user applications. The application processor may interface with baseband modem 206 and act as a source (in the transmit path) and a sink (in the receive path) for user data, such as voice data, audio/video/image data, messaging data, application data, basic Internet/web access data, etc. In the transmit path, protocol controller 210 may receive and process outgoing data provided by application processor 212 according to the layer-specific functions of the protocol stack, and provide the resulting data to digital signal processor 208. Digital signal processor 208 may then perform physical layer processing on the received data to produce digital baseband samples, which digital signal processor may provide to transceiver 204. Transceiver 204 may then process the digital baseband samples to convert the digital baseband samples to analog RF signals, which transceiver 204 may wirelessly transmit via antenna system 202. In the receive path, transceiver 204 may receive analog RF signals from antenna system 202 and process the analog RF signals to obtain digital baseband samples. Transceiver 204 may provide the digital baseband samples to digital signal processor 208, which may perform physical layer processing on the digital baseband samples. Digital signal processor 208 may then provide the resulting data to protocol controller 210, which may process the resulting data according to the layer-specific functions of the protocol stack and provide the resulting incoming data to application processor 212. Application processor 212 may then handle the incoming data at the application layer, which can include execution of one or more application programs with the data and/or presentation of the data to a user via a user interface.

Memory 214 may embody a memory component of device 102, such as a hard drive or another such permanent memory device. Although not explicitly depicted in FIG. 2, the various other components of device 102 shown in FIG. 2 may additionally each include integrated permanent and non-permanent memory components, such as for storing software program code, buffering data, etc.

Wi-Fi sensing in 2.4/5/6 GHz is typically performed by tracking the channel state of multiple Wi-Fi packets over time and detecting changes that indicate an event of interest. For example, relying on changes to a channel state caused by a person or object moving between two or more stations. As a person or object moves around a given environment, it impacts how a Wi-Fi signal propagates from the transmitter to the receiver. For example, the propagation paths are created and destroyed generating time-varying multipath fading.

A channel state may be a channel frequency response (CFR) estimation. The CFR estimation may be determined by processing transmitted data of a received PPDU using, for example, the Non-HT Long Training Field (L-LTF), Very High Throughput (VHT) Long Training Field (VHT-LTF), or Enhanced Directional Multi-Gigabit Channel Estimation field (EDMG-CEF).

Figure 3B:
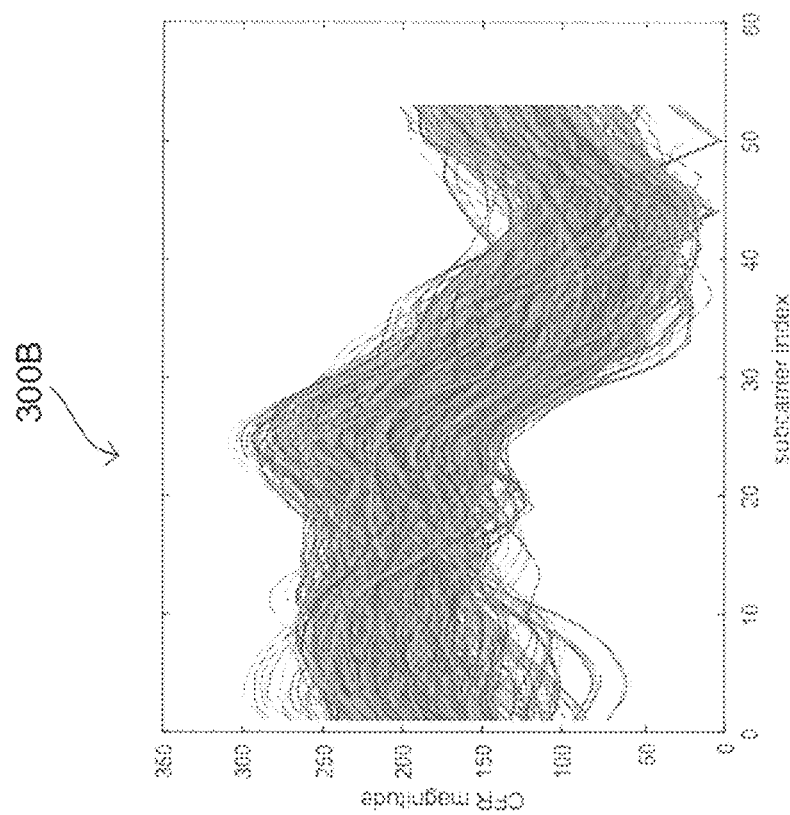
FIGS. 3A and 3B show exemplary graphs depicting channel estimates according to some aspects.
Figure 3A:
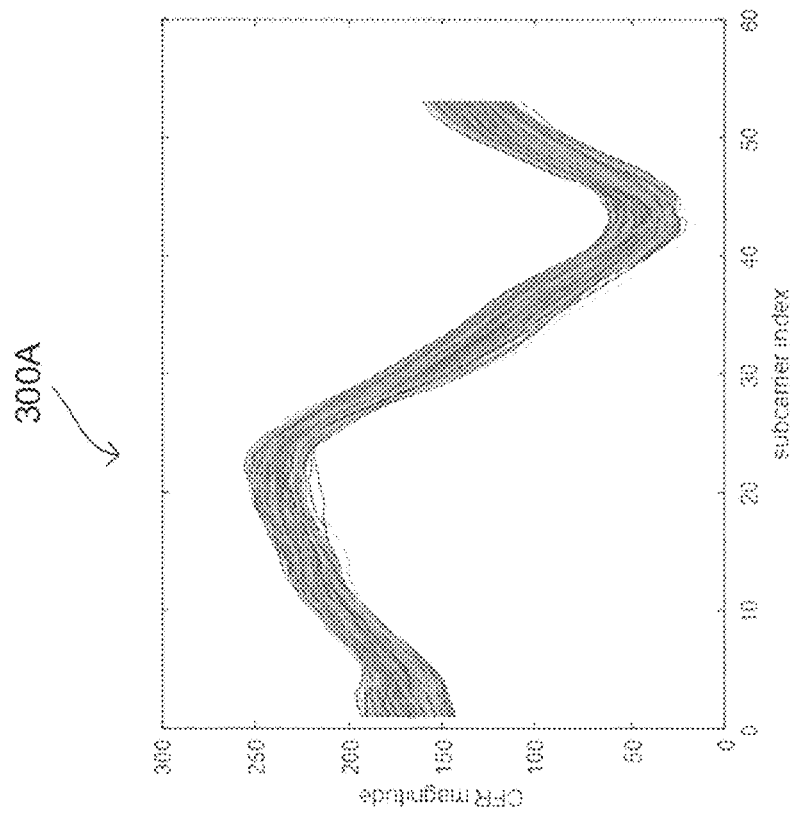

FIGS. 3A and 3B illustrate the impact of motion to channel estimates obtained with multiple Wi-Fi packets over time. They show the amplitude of multiple channel frequency responses (CFRs) obtained with PPDUs received over a period of time, for example 3 minutes. Each unique curve corresponding to the channel estimate measurement obtained with a single PPDU. FIG. 3A illustrates a plurality of channel estimate measurements obtained with a plurality of PPDUs 300A in a static environment. For example, an environment without any motion between the STAs participating in Wi-Fi sensing. FIG. 3B illustrates a plurality of channel estimate measurements obtained with a plurality PPDUs 300B in an environment with motion. For example, a person walking through a room with several stations participating in Wi-Fi sensing. A person walking around one or more stations participating in Wi-Fi sensing disrupts the wireless communication channel. The amplitude of CFRs obtained from received PPDUs is more erratic in an environment with motion 300B than in a static environment 300A. Such differences in amplitude may be used to detect a change in a state of the wireless communication environment.

It is assumed in Wi-Fi sensing that the person or object being sensed (detected/tracked) is not carrying a Wi-Fi device, or if they are carrying a Wi-Fi device, that that device does not collaborate with the one or more Wi-Fi sensing devices.

FIGS. 4A and 4B illustrate the concept of using relative position to detect the movement of one or more of the STAs participating in Wi-Fi sensing. FIG. 4A illustrates four STAs participating in Wi-Fi sensing before the movement of the first STA 402. FIG. 4B illustrates the same four STAs participating in Wi-Fi sensing as in FIG. 4A after the movement of the first STA 402.

FIG. 4A illustrates Wi-Fi sensing system 400. Four STAs 402, 404, 406, and 408 are participating in Wi-Fi sensing. Any of the four STAs 402, 404, 406, or 408 may be capable of executing a Wi-Fi sensing application. Wi-Fi sensing may be improved by using position information. For example, as the four STAs communicate, the first STA 402 may determine relative position 410 between first STA 402 and second STA 404, relative position 412 between first STA 402 and fourth STA 408, and relative position 416 between first STA 402 and third STA 406. Second STA 404 may determine relative position 414 between second STA 404 and third STA 406 and relative position 418 between second STA 404 and fourth STA 408. Third STA 406 may determine relative position 420 between third STA 406 and fourth STA 408. If more STAs are part of the Wi-Fi sensing system, all relative positions between all pairs of STAS may be determined to improve Wi-Fi sensing.

FIG. 4B illustrates Wi-Fi sensing system 400 at a different point in time than FIG. 4A. For example, FIG. 4B may be an illustration of Wi-Fi sensing system 400 at a later point in time than FIG. 4A after the first STA 402 has moved and position information has changed. For example, as the four STAs communicated they can determine which relative positions have changed. the first STA 402 may determine relative position 430 between first STA 402 and second STA 404, relative position 432 between first STA 402 and fourth STA 408, and relative position 436 between first STA 402 and third STA 406. Second STA 404 may determine relative position 434 between second STA 404 and third STA 406 and relative position 438 between second STA 404 and fourth STA 408. Third STA 406 may determine relative position 440 between third STA 406 and fourth STA 408. Because in this example only first STA 402 has moved only relative position information between first STA and other STAs has changed.

Some of the relative position information may stay the same. For example, relative positions 414 and 434 are the same, relative positions 418 and 438 are the same, and relative positions 420 and 440 are the same. However, relative positions 430, 432, and 436 corresponding to same pairs of STAs as relative positions 410, 412, and 416 respectively are not the same. Therefore, a Wi-Fi sensing application may determine that first STA 402 has moved. Furthermore, it may be more accurate to eliminate channel estimation measurements involving first STA 402 when determining a change in a state of a wireless communication channel. For example, when comparing the differences between FIGS. 3A and 3B, it is clear that the Wi-Fi sensing environment has changed. However, it does not identify the source causing the change. For example, the change may be caused by movement of a person or object within the Wi-Fi sensing environment, changing transmitter settings, or movement of STAs participating in Wi-Fi sensing as illustrated between FIGS. 4A and 4B. Reporting changes in a Wi-Fi sensing environment caused by STA movement may be considered a "false alarm." Eliminating false alarms may be accomplished by determining that the change in a Wi-Fi sensing environment is caused by movement of STAs participating in Wi-Fi sensing.

Figure 5B:
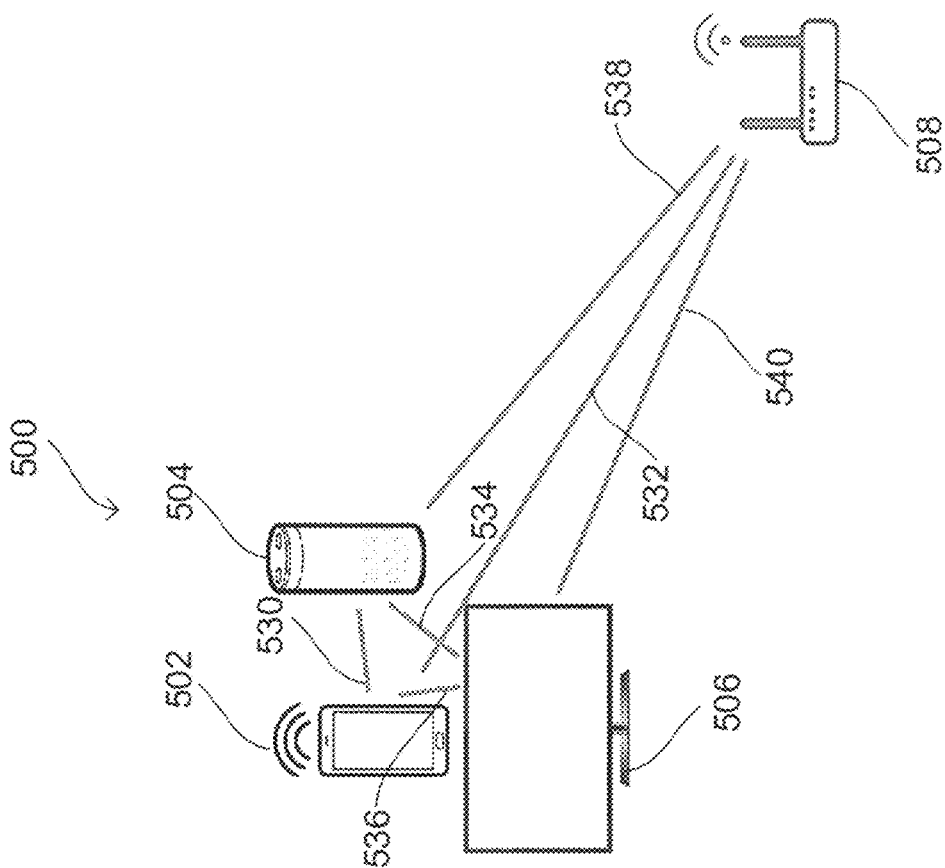
FIGS. 5A and 5B show an exemplary Wi-Fi sensing system according to some aspects.
Figure 5A:
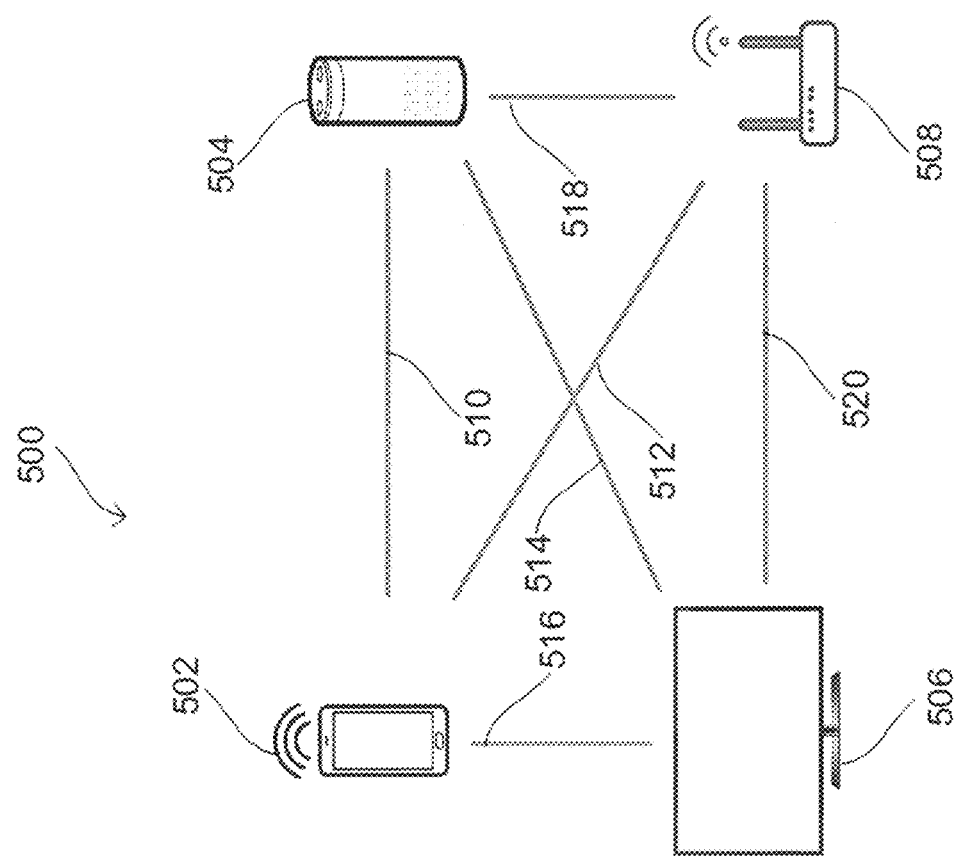

FIGS. 5A and 5B illustrate the concept of using relative position to detect that two or more of the STAs participating in Wi-Fi sensing are located in substantially the same position. FIG. 5A illustrates four STAs participating in Wi-Fi sensing similar to those illustrated in FIG. 4A. FIG. 5B illustrates the same four STAs participating in Wi-Fi sensing as in FIG. 5A after several of the STAs participating in Wi-Fi sensing have been moved to substantially the same position.

Similar to FIG. 4A, FIG. 5A illustrates Wi-Fi sensing system 500. Four STAs 502, 504, 506, and 508 are participating in Wi-Fi sensing. Any of the four STAs 502, 504, 506, or 508 may be capable of executing a Wi-Fi sensing application. Wi-Fi sensing may be improved by using position information. For example, as the four STAs communicate, the first STA 502 may determine relative position 510 between first STA 502 and second STA 504, relative position 512 between first STA 502 and fourth STA 508, and relative position 516 between first STA 502 and third STA 506. Second STA 504 may determine relative position 514 between second STA 504 and third STA 506 and relative position 518 between second STA 504 and fourth STA 508. Third STA 506 may determine relative position 520 between third STA 506 and fourth STA 508. If more STAs are part of the Wi-Fi sensing system, all relative positions between all pairs of STAS may be determined to improve Wi-Fi sensing.

FIG. 5B illustrates Wi-Fi sensing system 500 at a point in time when some of the STAs have been repositioned as compared to Wi-Fi sensing system 500 in FIG. 5A. Four STAs 502, 504, 506, and 508 are participating in Wi-Fi sensing. Three of the four STAs 502, 504, and 506 are in substantially the same relative position with respect to STA 508. It is possible for Wi-Fi sensing system 500 to correlate channel estimate measurements for STAs. For example, a Wi-Fi sensing application operating on STA 508 may determine a correlation of PPDUs between itself and STAs 502, 504, and 506. Using relative position measurements, Wi-Fi sensing system 500 may determine a correlation of PPDUs from STAs 502, 504, and 506. The Wi-Fi sensing device 508 may determine that STAs 502, 504, and 506 participating in Wi-Fi sensing are just a few centimeters from each other. Wi-Fi sensing system 500 may determine that channel estimation measurements from these stations are correlated. The Wi-Fi sensing application may rely on this determination to improve the reliability of the process and/or to reduce Wi-Fi sensing network traffic. Because the channel estimation measurements from STAs 502, 504, and 506 have been determined to be correlated, their results would likely be the similar. Wi-Fi sensing system, may choose to use CSIs from only one of the three STAs 502, 504, and 506 to reduce traffic. For example, reducing the overhead of the Wi-Fi sensing to the network by reducing the number of STAs transmitting and receiving PPDUs for use in Wi-Fi sensing.

FIGS. 6A and 6B illustrate an example of determining position information. Position information may be determined using an 802.11 protocol such as 802.11 REVmc/FTM or 802.11az. Such an implementation may take advantage of hardware and software which supports 802.11 protocols. FIG. 6A illustrates an example a negotiation phase of measuring position. FIG. 6B illustrates an example measurement phase of measuring position. These examples focus on the FTM protocol. An FTM session is an instance of an FTM procedure between an initiating STA and a responding STA. Additionally, an FTM instance includes scheduling and operational parameters corresponding to the initiating and responding STAs.

FIG. 6A illustrates the negotiation phase 600A of an FTM session. The instance of an FTM procedure begins between an initiating STA 602 and a responding STA 604. Initiating STA 602 requests a periodic window allocation for a FTM frame exchange. The responding STA 604 may accept the parameters associated with the initiation request from initiating STA 602. Alternatively, the responding STA 604 may override the parameters associated with the initiation request from initiating STA 602. The FTM session parameters include timing and transmission parameters further defined below. Once the FTM frame exchange parameters have been established between initiating STA 602 and responding STA 604, the measurement phase may begin.

FIG. 6B illustrates the measurement phase 600B of an FTM session. The measurement exchange consists of one or more burst instances between initiating STA 602 and responding STA 604 as established by parameters during the negotiation phase 600A. For example, a predetermined periodicity, within a pre-determined time window duration, and with a predetermined number of FTM frame transmissions. The burst instance as shown in FIG. 6B is for a case when the number of FTM frames transmitted by the responding STA 604 within each burst instance is equal to 2.

The 802.11 protocol supports cases in which an initiating STA 602 might have multiple ongoing FTM sessions on the same or different channels with different responding STAs 604, while being associated with an access point (AP) for the exchange of data or signaling. The ability to obtain CSI measurements using transmissions from/to multiple stations is also key for Wi-Fi sensing. A Wi-Fi sensing implementation that re-uses FTM/11az will thus inherit this important feature.

FIG. 7 illustrates exemplary method of performing position aided Wi-Fi sensing at a wireless communication device according to some aspects. FIG. 7 shows exemplary method 700. As shown in FIG. 7, method 700 includes storing instructions (stage 702); determining a plurality of channel estimation measurements corresponding to a plurality of PPDUs received from a wireless communication device (stage 704); determining a plurality of position measurements using information about the transmission of the plurality PPDUs, wherein the position measurement is a position of the wireless communication device relative to a further wireless communication device (stage 706); selecting a subset of the plurality of channel estimation measurements based on the plurality of position measurements (stage 708); and determining a change in a state of the wireless communication channel based on the selected subset of the plurality of channel estimation measurements (stage 710).

Position-aided Wi-Fi sensing may be described as the use of information regarding the relative position between STAs participating in Wi-Fi sensing to improve Wi-Fi sensing. Including position information leads to better reliability and/or accuracy in Wi-Fi sensing. Position-aided Wi-Fi sensing may be accomplished in several ways. In an example, position-aided Wi-Fi sensing may use relative position information to identify motion of one or more STAs used in Wi-Fi sensing to eliminate certain channel estimation measurements for STAs in motion. In another example, position-aided Wi-Fi sensing may use relative position information to estimate correlation among sensing measurements and reduce the network overhead of Wi-Fi sensing by eliminating channel estimation measurements from an STA which has the same or similar relative position of another STA. Other methods of using relative position information to improve Wi-Fi sensing may be considered.

Position information may be obtained using a Wi-Fi-based procedure, such as Fine Timing Measurement (FTM), IEEE802.11az. Alternatively, position information may be obtained using other technologies such as WB, and/or GPS/GNSS.

When using a Wi-Fi-based procedure to obtain position information, the Wi-Fi sensing procedure and the positioning procedure could be completely independent. For example, position information may be obtained using FTM and/or IEEE802.11az, and sensing information may be obtained by different protocols or procedures by using different PPDUs. or Alternatively, Wi-Fi sensing information may be obtained by using packets exchanged as part determining positioning information, such as through FTM and/or 802.11az protocols. The CSIs used by Wi-Fi sensing could be obtained by using the same PPDUs transmitted as part of the FTM and/or 802.11az procedure. This results in a procedure which re-uses hardware and software that supports 802.11-based positioning, for example 802.11 REVmc/FTM or 802.11az.

As previously discussed Wi-Fi sensing is performed by tracking the channel state of multiple Wi-Fi packets over time and detecting changes that indicate an event of interest. Changes in channel estimates could be a result of changes in the environment, changes in the transmitter configuration (such as use of a different beamforming matrix), or changes in the position of the transmitter and/or receiver. A Wi-Fi sensing application must be able to differentiate changes in the environment from other possible changes.

Channel state changes that are due to a change in transmitter configuration could be identified by clustering a plurality of channel estimation measurements into a plurality of clusters based on a clustering criterion and a plurality of channel estimation measurements corresponding to a plurality of Physical Protocol Data Units (PPDUs) received from a wireless communication device over a wireless communication channel. Based on the clustering of the plurality of channel estimation measurements into the plurality of clusters, select a clustered channel estimate measurement to be processed for detection of changes in an environment of the wireless communication channel. The clustered channel estimation measurement together in combination with one or more other clustered channel estimation measurements of the same cluster may be used to detect a change in the clustered channel estimation measurements. A change in measurements would indicate a change in the environment. Alternatively, changes into the 802.11 standard that enable the transmitter to indicate such configuration changes would allow Wi-Fi sensing applications to ignore configuration changes.

To avoid Wi-Fi sensing applications being negatively affected by a change in the position of an STA, Wi-Fi sensing may be configured to rely on devices that are known to be static. For example, smart TVs fixed into a wall or an AP that is unlikely to move from its position on top of a bookshelf. However, this would reduce the number of devices that could participate in Wi-Fi sensing and could also fail in certain scenarios.

It may be beneficial to detect a relative position of STAs participating in Wi-Fi sensing and determine whether or not to include channel estimation measurements from such STAs in Wi-Fi sensing. Relative position information of an STA may be used to identify motion of one or more STAs used in Wi-Fi sensing. By tracking the relative position or distances among the multiple STAs participating in Wi-Fi sensing devices over time, the Wi-Fi sensing system would be able to identify that an STA has moved from one sensing interval to the next. This is because the estimated distances associated with an STA that has moved would change over time, while estimated distances associated with an STA that has not moved would not change over time. With this information, a Wi-Fi sensing application would discard measurements obtained from signals transmitted by the STA that has moved. When it can be determined that the STA is no longer moving, the Wi-Fi sensing system may resume using measurements associated with that STA. In the meantime, signals from STAs that have not moved may continue to be used by the Wi-Fi sensing application.

Position information may be used to identify stations that should not be used in Wi-Fi sensing while they are moving and suppress false alarms. Additionally, other situations may be identified by the use of position information to indicate that something is happening in the network, but should not be used in Wi-Fi sensing.

For example, if one or more STAs participating in Wi-Fi sensing are determined to be in motion Wi-Fi sensing may not be reliable for a period of time. The Wi-Fi sensing application may determine if the static STAs provide a reliable enough indication of the wireless channel environment. For example, a home security application may determine not to sound an alarm if its Wi-Fi sensing system determines that one of the participating STAs is in motion. Once it is determined that the STA is no longer in motion, the Wi-Fi sensing application may resume reporting changes in communication channel environment changes.

In Wi-Fi sensing applications, such as a home security system, it is reasonable to expect that performance would be improved by placing Wi-Fi sensing system participating STAs in different places of a home. For example, it may be advantageous to place one STA in the living room downstairs and one STA in each bedroom upstairs as opposed to all participating STAs being placed on the same shelf of a room.

Because Wi-Fi sensing relies on changes to wireless signals resultant from changes in the environment, if the sensing STAs are physically close to each other, their measurements, and thus decisions, would be correlated. Measurement correlation is serious since it effectively lowers the amount of information obtained from multiple links. In addition, due to measurement correlation, the Wi-Fi sensing protocol would add unnecessary traffic to the network.

The ability to correlate two or more STAs participating in Wi-Fi sensing systems may reduce the load the Wi-Fi sensing system puts on a network. are be able to mitigate the negative impact of correlated STAs to the overall performance and network load of a Wi-Fi sensing system.

For example, participating STAs positioned in proximity with each other would likely be correlated when received by further STA positioned elsewhere. Because they are physically close to each other, STAs positioned in proximity with each other will often have similar channel estimate measurements and would be impacted similarly by motion in the environment. If the sensing station is aware that some participating STAs are positioned within centimeters of each other, the Wi-Fi sensing system may process their measurements differently. For example, the Wi-Fi sensing system may only request sensing measurements from one of the proximately positioned STAs, ignore transmissions from at least one of the proximately positioned STAs, or weigh measurements obtained from the proximately positioned STAs in an appropriate way.

Wi-Fi sensing systems may use FTM frame exchanges to determine a position measurements and channel estimation measurements. During a negotiation phase, FTM timing and transmission parameters may be negotiated used to satisfy requirement for determining position and channel estimation measurements. An initiating STA may request timing and transmission parameters. Initiating STA may request "number of bursts exponent", "burst duration", "FTMs per burst", and "burst period" as part of the timing parameters. Additionally, initiating STA may request "format" and "bandwidth" as part of the transmission parameters. After the initiating and responding STAs have established the parameters, position information may be determined to aid in Wi-Fi sensing.

To support Wi-Fi sensing applications such as proximity detection and home security, the "format" and "bandwidth" transmission parameters may be set to different values than that for the transmission of position information. For example, the signal bandwidth parameter for Wi-Fi sensing may be set to a smaller or larger value than that required for determining position information.

During a measurement phase, the responding STA transmits both ACK and FTM frames. FTM frames sent by the responding STA to the initiating STA satisfy parameters negotiated during the negotiation phase and thus can be used by the initiating STA to reliably implement sensing. Specifically, the initiating STA implementation may use FTM frames transmitted by a responding STA to estimate the channel between the responding STA and the initiating STA. To do so, the initiating STA simply uses long training fields (VHT-LTF, for example) of received FTM frames (as it does for data demodulation).

The FTM protocol is already defined in 802.11 standards and found in commercial Wi-Fi chipsets. It is possible to use the FTM protocol as shown in FIGS. 6A and 6B without having the initiating STA estimating the time of arrival. For example, the responding STA responds according to the FTM protocol for determining position information. However, the initiating STA uses the PPDUs from the responding STA to make channel measurements in support of a Wi-Fi sensing applications instead of determining position information.

Combining position information with Wi-Fi sensing may increase accuracy and performance of Wi-Fi sensing systems. As demonstrated, to increase accuracy and reliability, a Wi-Fi sensing "initiator" (initiating STA) may request a "responder" (responding STA) to take CSI measurements and to feedback/report them back to the "initiator." This configuration requires new elements to be included in the FTM/802.11az positioning protocol, such as new parameter definitions.

Specifically, during the negotiation phase, the initiating STA may indicate that it requires the responding STA to obtain CSI measurements and feed them back to the initiating STA. This could be implemented, by defining a new "CSI Measurement Request" field within the "Fine Timing Measurement Request" frame used to negotiate the exchange. While timing and transmission parameters of the sensing protocol would be defined by the "Fine Timing Measurement Parameters" field within the same frame. The Wi-Fi sensing specific parameters could be defined in the new "CSI Measurement Request" field.

For example, the new field could be used to negotiate the feedback type, such as "CSI measurement" (as defined in standard 802.11-2016, lines of 19.3.12.3—explicit feedback beamforming) or compressed. To reduce overhead, the initiating STA could also define a carrier grouping factor and resolution (e.g., 4, 5, 6, or 8 bits).

For the measurement phase exchange between the initiating STA and responding STA, the FTM frame sent by the responding STA must include CSI measurements in addition to FTM measurements. (See FIG. 6B t1_k and t4_k).

One possibility to include CSI and FTM measurements in a response would extend the "Radio Measurement Request" and "Radio Measurement Report" frames to include a new measurement type (CSI). As previously disclosed, the report could be the actual CSI measurement or a compressed version of the measurement.

Alternatively, a response may include a new "CSI Report" field in the "Fine Timing Measurement Action" frame. Again, the report could be the actual CSI measurement or a compressed version of the measurement.

In summary, even for the more complex case when sensing measurements are taken by the responding STA (because it requires feedback), the overall FTM flow currently defined in IEEE 802.11-2016 can still be applied. To accomplish this, the initiating STA requests CSI measurements and defines the type and the mechanism for CSI reporting.

Various aspects may utilize one or more machine learning models to determine if Wi-Fi sensing application should report a detected change of state. A machine learning model may be executed by a computing system to progressively improve performance of detecting a change in a communication channel state.

A machine learning model may be adjusted during a training phase based on training data. A trained machine learning model may be used during an inference phase to make predictions or decisions based on input data. In some aspects, the trained machine learning model may be used to generate additional training data. An additional machine learning model may be adjusted during a second training phase based on the generated additional training data. A trained additional machine learning model may be used during an inference phase to make predictions or decisions based on input data.

The machine learning models described herein may take any suitable form or utilize any suitable technique (e.g., for training purposes). For example, any of the machine learning models may utilize supervised learning, semi-supervised learning, unsupervised learning, or reinforcement learning techniques.

In supervised learning, the model may be built using a training set of data including both the inputs and the corresponding desired outputs. Each training instance may include one or more inputs and a desired output. Training may include iterating through training instances and using an objective function to teach the model to predict the output for new inputs not part of the initial training set. In semi-supervised learning, a portion of the inputs in the training set may be missing the respective desired outputs (e.g., one or more inputs may not be associated with any desired or expected output).

In unsupervised learning, the model may be built from a training set of data including only inputs and no desired outputs. The unsupervised model may be used to find structure in the data, illustratively, by discovering patterns in the data. Techniques that may be implemented in an unsupervised learning model may include, e.g., self-organizing maps, nearest-neighbor mapping, k-means clustering, and singular value decomposition.

Reinforcement learning models may include positive or negative feedback to improve accuracy. A reinforcement learning model may attempt to maximize one or more objectives/rewards. Techniques that may be implemented in a reinforcement learning model may include, Q-learning, temporal difference (TD), and deep adversarial networks.

Various aspects described herein may utilize one or more classification models to classify outputs based on inputs. An input set may include position measurements, channel estimation measurements, and other wireless communication channel environment data. A classification model as described herein may classify certain changes in a communication channel as a change in a state of the channel environment based on other input data. For example, erratic CSI measurements may not be classified as a change in the state of the channel environment based on position data indicating a station in the Wi-Fi sensing system is in motion. References herein to classification models may contemplate a model that implements linear classifiers, support vector machines, decision trees, boosted trees, random forest, neural networks, and/or nearest neighbor.

As part of a Wi-Fi sensing application, machine learning may be trained to determine certains scenarios. For example, if an intruder has broken into a home for a home security system or determine that the number of people in a room has exceeded a maximum occupancy.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

While the above descriptions and connected figures may depict electronic device components as separate elements, skilled persons will appreciate the various possibilities to combine or integrate discrete elements into a single element. Such may include combining two or more circuits for form a single circuit, mounting two or more circuits onto a common chip or chassis to form an integrated element, executing discrete software components on a common processor core, etc. Conversely, skilled persons will recognize the possibility to separate a single element into two or more discrete elements, such as splitting a single circuit into two or more separate circuits, separating a chip or chassis into discrete elements originally provided thereon, separating a software component into two or more sections and executing each on a separate processor core, etc.

It is appreciated that implementations of methods detailed herein are demonstrative in nature, and are thus understood as capable of being implemented in a corresponding device. Likewise, it is appreciated that implementations of devices detailed herein are understood as capable of being implemented as a corresponding method. It is thus understood that a device corresponding to a method detailed herein may include one or more components configured to perform each aspect of the related method.

All acronyms defined in the above description additionally hold in all claims included herein.

The following examples disclose various aspects of this disclosure:

In Example 1, a wireless communication device for communicating across a wireless communication channel including: a memory configured to store instructions; one or more processors coupled to the memory to execute the instructions stored in the memory, wherein the instructions are configured to: determine a plurality of channel estimation measurements corresponding to a plurality of physical protocol data units (PPDUs) received from one or more further wireless communication devices; determine a plurality of position measurements using information about the transmission of the plurality PPDUs, wherein the position measurement is a position of the one or more further wireless communication devices relative to the wireless communication device; select a subset of the plurality of channel estimation measurements based on the plurality of position measurements; and determine a change in a state of the wireless communication channel based on the selected subset of the plurality of channel estimation measurements.

In Example 2, the subject matter of Example 1, may optionally further include wherein the a plurality of channel estimation measurements, and the plurality of position measurements are limited to a time period.

In Example 3, the subject matter of Examples 1 and 2 may optionally further include wherein the plurality of position measurements are determined by a fine timing (FTM) protocol.

In Example 4, the subject matter of Examples 1 to 3 may optionally further include wherein the FTM protocol determines position measurements using a time of flight measurement.

In Example 5, the subject matter of Examples 1 to 4 may optionally further include wherein the time of flight is the time of a round trip of a signal between the wireless communication device and the one or more further wireless communication devices.

In Example 6, the subject matter of Examples 1 to 5 may optionally further include wherein the plurality of position measurements are determined by ultra-wideband (UWB) technology.

In Example 7, the subject matter of Examples 1 to 6 may optionally further include wherein the plurality of position measurements are determined by a Global Navigation Satellite System (GNSS).

In Example 8, the subject matter of Examples 1 to 7 may optionally further include wherein the plurality of position measurements are determined by a Global Positioning System (GPS).

In Example 9, the subject matter of Examples 1 to 8 may optionally further include wherein the instructions include a change threshold for the subset of the plurality of channel estimation measurements.

In Example 10, the subject matter of Examples 1 to 9 may optionally further include wherein the determination of the change in the state of the wireless communication channel is based on the satisfaction of the change threshold.

In Example 11, the subject matter of Examples 1 to 10 may optionally further include a sensing antenna, wherein the sensing antenna is designated for a sensing activity.

In Example 12, the subject matter of Examples 1 to 11 may optionally further include wherein the instructions are further configured to determine that at least two of the one or more further wireless communication devices comprise substantially the same position.

In Example 13, the subject matter of Examples 1 to 12 may optionally further include wherein the instructions are further configured to exclude PPDUs from at least one of the at least two of the one or more further wireless communication devices.

In Example 14, the subject matter of Examples 1 to 13 may optionally further include wherein the instructions are further configured to determine a motion within an environment of the wireless communication device.

In Example 15, the subject matter of Examples 1 to 14 may optionally further include wherein the motion is a movement of the one or more further wireless communication devices.

In Example 16, the subject matter of Examples 1 to 15 may optionally further include wherein the motion is a movement of an object between the wireless communication devices and the one or more further wireless communication devices.

In Example 17, the subject matter of Examples 1 to 16 may optionally further include wherein the instructions are further configured to determine a number of objects within the environment of the wireless communication device.

In Example 18, the subject matter of Examples 1 to 17 may optionally further include wherein the instructions are further configured to recognize a pattern of the motion.

In Example 19, the subject matter of Examples 1 to 18 may optionally further include wherein the instructions are further configured to exclude channel estimation measurements associated with the recognized pattern from the subset of the plurality of channel estimation measurements.

In Example 20, the subject matter of Examples 1 to 19 may optionally further include wherein the wireless communication device and the one or more of further wireless communication devices form a mesh network.

In Example 21, a method of performing wireless communication at a wireless communication device including: determining a plurality of channel estimation measurements corresponding to a plurality of PPDUs received from a plurality of further wireless communication devices; determining a plurality of position measurements using information about the transmission of the plurality PPDUs, wherein the position measurement is a position of the further wireless communication device relative to the wireless communication device; selecting a subset of the plurality of channel estimation measurements based on the plurality of position measurements; and determining a change in a state of the wireless communication channel based on the selected subset of the plurality of channel estimation measurements.

In Example 22, the subject matter of Example 21 may optionally further include wherein the a plurality of channel estimation measurements, and the plurality of position measurements are limited to a time period.

In Example 23, the subject matter of Examples 21 and 22 may optionally further include wherein the plurality of position measurements are determined by a fine timing (FTM) protocol.

In Example 24, the subject matter of Examples 21 and 23 may optionally further include wherein the FTM protocol determines position measurements using a time of flight measurement.

In Example 25, the subject matter of Examples 21 and 24 may optionally further include wherein the time of flight is the time of a round trip of a signal between the wireless communication device and one of the one or more further wireless communication devices.

In Example 26, the subject matter of Examples 21 and 25 may optionally further include wherein the plurality of position measurements are determined by ultra-wideband (UWB) technology.

In Example 27, the subject matter of Examples 21 and 26 may optionally further include wherein the plurality of position measurements are determined by a Global Navigation Satellite System (GNSS).

In Example 28, the subject matter of Examples 21 and 27 may optionally further include wherein the plurality of position measurements are determined by a Global Positioning System (GPS).

In Example 29, the subject matter of Examples 21 and 28 may optionally further include wherein the instructions include a change threshold for the subset of the plurality of channel estimation measurements.

In Example 30, the subject matter of Examples 21 and 29 may optionally further include wherein the determination of the change in the state of the wireless communication channel is based on the satisfaction of the change threshold.

In Example 31, the subject matter of Examples 21 and 30 may optionally further include a sensing antenna, wherein the sensing antenna is designated for a sensing activity.

In Example 32, the subject matter of Examples 21 and 31 may optionally further include wherein the instructions are further configured to determine that at least two of the one or more further wireless communication devices comprise substantially the same position.

In Example 33, the subject matter of Examples 21 and 32 may optionally further include wherein the instructions are further configured to exclude PPDUs from at least one of the at least two of the one or more further wireless communication devices.

In Example 34, the subject matter of Examples 21 and 33 may optionally further include wherein the instructions are further configured to determine a motion within an environment of the wireless communication device.

In Example 35, the subject matter of Examples 21 and 34 may optionally further include wherein the motion is a movement of the one or more further wireless communication devices.

In Example 36, the subject matter of Examples 21 and 35 may optionally further include wherein the motion is a movement of an object between the wireless communication devices and the one or more further wireless communication devices.

In Example 37, the subject matter of Examples 21 and 36 may optionally further include wherein the instructions are further configured to determine a number of objects within the environment of the wireless communication device.

In Example 38, the subject matter of Examples 21 and 37 may optionally further include wherein the instructions are further configured to recognize a pattern of the motion.

In Example 39, the subject matter of Examples 21 and 38 may optionally further include wherein the instructions are further configured to exclude channel estimation measurements associated with the recognized pattern from the subset of the plurality of channel estimation measurements.

In Example 40, the subject matter of Examples 21 and 39 may optionally further include wherein the wireless communication device and the one or more of further wireless communication devices form a mesh network.

In Example 41, one or more non-transitory computer readable media comprising programmable instructions thereon, that when executed by one or more processors of a device, cause the device to perform any one of the method of Examples 21-40.

In Example 42, a wireless communication device for communicating across a wireless communication channel including: a memory configured to store instructions; one or more processors coupled to the memory to execute the instructions stored in the memory, wherein the instructions are configured to: determine a plurality of channel estimation measurements corresponding to a plurality of physical protocol data units (PPDUs) received from one or more additional wireless communication devices; determine a plurality of position measurements using information about the transmission of the plurality PPDUs, wherein the position measurement is a position of the one or more additional wireless communication devices relative to the wireless communication device; select a subset of the plurality of channel estimation measurements based on the plurality of position measurements; and determine a change in a state of the wireless communication channel based on the selected subset of the plurality of channel estimation measurements.

In Example 43, the subject matter of Example 42, may optionally further include wherein the a plurality of channel estimation measurements, and the plurality of position measurements are limited to a time period.

In Example 44, the subject matter of Examples 42 and 43 may optionally further include wherein the plurality of position measurements are determined by a fine timing (FTM) protocol.

In Example 45, the subject matter of Examples 42 to 44 may optionally further include wherein the FTM protocol determines position measurements using a time of flight measurement.

In Example 46, the subject matter of Examples 42 to 45 may optionally further include wherein the time of flight is the time of a round trip of a signal between the wireless communication device and the one or more additional wireless communication devices.

In Example 47, the subject matter of Examples 42 to 46 may optionally further include wherein the plurality of position measurements are determined by ultra-wideband (UWB) technology.

In Example 48, the subject matter of Examples 42 to 47 may optionally further include wherein the plurality of position measurements are determined by a Global Navigation Satellite System (GNSS).

In Example 49, the subject matter of Examples 42 to 48 may optionally further include wherein the plurality of position measurements are determined by a Global Positioning System (GPS).

In Example 50, the subject matter of Examples 42 to 49 may optionally further include wherein the instructions include a change threshold for the subset of the plurality of channel estimation measurements.

In Example 51, the subject matter of Examples 42 to 50 may optionally further include wherein the determination of the change in the state of the wireless communication channel is based on the satisfaction of the change threshold.

In Example 52, the subject matter of Examples 42 to 51 may optionally further include a sensing antenna, wherein the sensing antenna is designated for a sensing activity.

In Example 53, the subject matter of Examples 42 to 52 may optionally further include wherein the instructions are further configured to determine that at least two of the one or more additional wireless communication devices comprise substantially the same position.

In Example 54, the subject matter of Examples 42 to 53 may optionally further include wherein the instructions are further configured to exclude PPDUs from at least one of the at least two of the one or more additional wireless communication devices.

In Example 55, the subject matter of Examples 42 to 54 may optionally further include wherein the instructions are further configured to determine a motion within an environment of the wireless communication device.

In Example 56, the subject matter of Examples 42 to 55 may optionally further include wherein the motion is a movement of the one or more additional wireless communication devices.

In Example 57, the subject matter of Examples 42 to 56 may optionally further include wherein the motion is a movement of an object between the wireless communication devices and the one or more additional wireless communication devices.

In Example 58, the subject matter of Examples 42 to 57 may optionally further include wherein the instructions are further configured to determine a number of objects within the environment of the wireless communication device.

In Example 59, the subject matter of Examples 42 to 58 may optionally further include wherein the instructions are further configured to recognize a pattern of the motion.

In Example 60, the subject matter of Examples 42 to 59 may optionally further include wherein the instructions are further configured to exclude channel estimation measurements associated with the recognized pattern from the subset of the plurality of channel estimation measurements.

In Example 61, the subject matter of Examples 42 to 60 may optionally further include wherein the wireless communication device and the one or more of additional wireless communication devices form a mesh network.

In Example 62, a system comprising one or more devices according to any of Examples 1-20 and 42-61, the system configured to implement a method according to any of Examples 21-40.

In Example 63, a means for implementing any of the Examples 1-20 and 42-61.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. A wireless communication device for communicating across a wireless communication channel comprising:
   a memory configured to store instructions;
   one or more processors coupled to the memory to execute the instructions stored in the memory, wherein the instructions are configured to:
   determine a plurality of channel estimation measurements corresponding to a plurality of physical protocol data units (PPDUs) received from one or more additional wireless communication devices;
   determine a plurality of position measurements using information about the transmission of the plurality PPDUs, wherein the position measurement is a position of the one or more additional wireless communication devices relative to the wireless communication device;
   select a subset of the plurality of channel estimation measurements based on the plurality of position measurements; and
   determine a change in a state of the wireless communication channel based on the selected subset of the plurality of channel estimation measurements.

2. The wireless communication device of claim 1, wherein the a plurality of channel estimation measurements, and the plurality of position measurements are limited to a time period.

3. The wireless communication device of claim 1, wherein the plurality of position measurements are determined by a fine timing (FTM) protocol.

4. The wireless communication device of claim 3, wherein the FTM protocol determines position measurements using a time of flight measurement.

5. The wireless communication device of claim 4, wherein the time of flight is the time of a round trip of a signal between the wireless communication device and the one or more additional wireless communication devices.

6. The wireless communication device of claim 1, wherein the plurality of position measurements are determined by ultra-wideband (UWB) technology.

7. The wireless communication device of claim 1, wherein the plurality of position measurements are determined by a Global Navigation Satellite System (GNSS).

8. The wireless communication device of claim 7, wherein the plurality of position measurements are determined by a Global Positioning System (GPS).

9. The wireless communication device of claim 1, wherein the instructions include a change threshold for the subset of the plurality of channel estimation measurements.

10. The wireless communication device of claim 9, wherein the determination of the change in the state of the wireless communication channel is based on the satisfaction of the change threshold.

* * * * *